Aug. 30, 1960    F. FAHLAND    2,950,935
ATTACHING HEAD FOR A SUPPORTING CROSS BAR
Filed June 27, 1958
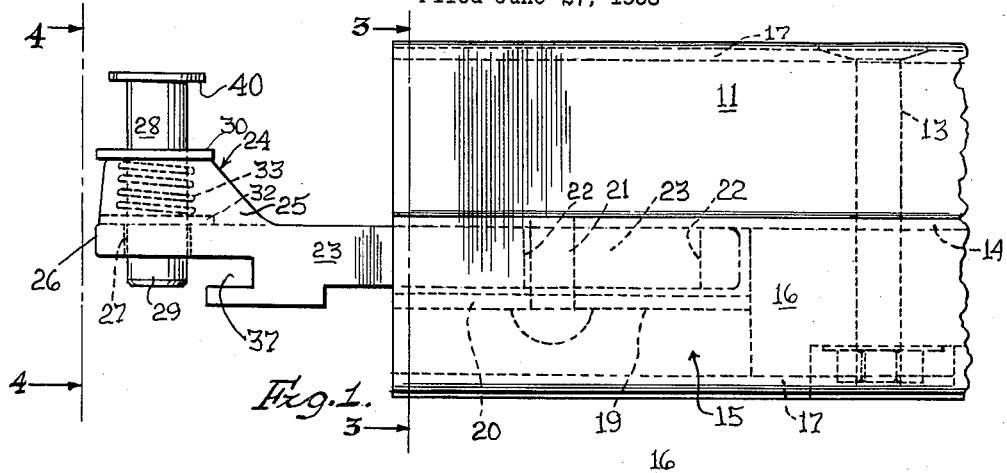
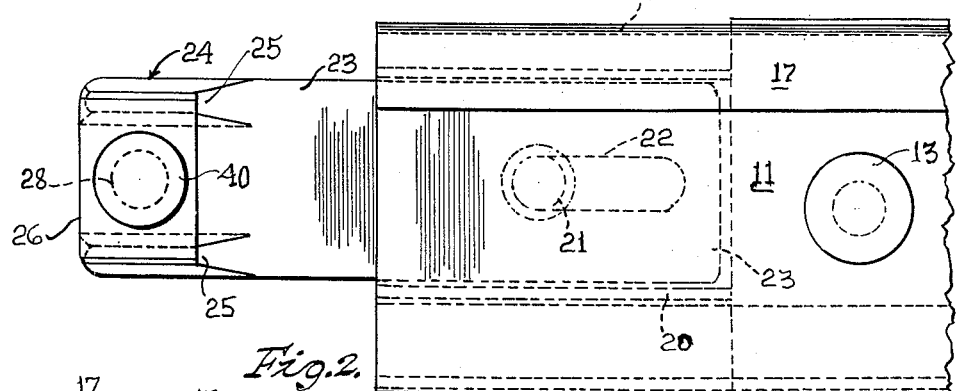
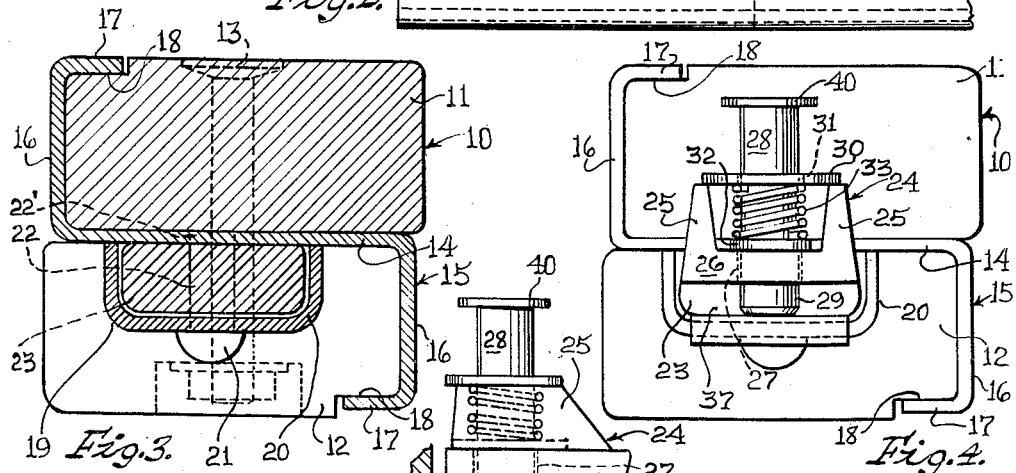
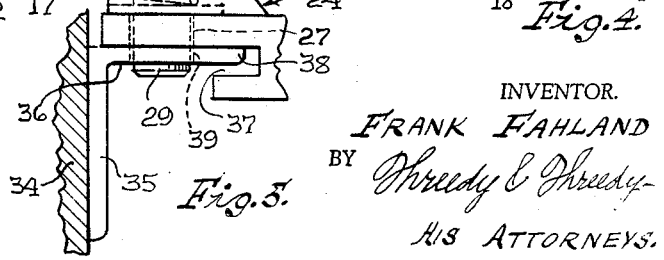
INVENTOR.
FRANK FAHLAND
BY Threedy & Threedy
HIS ATTORNEYS.

United States Patent Office 2,950,935
Patented Aug. 30, 1960

2,950,935
ATTACHING HEAD FOR A SUPPORTING CROSS BAR

Frank Fahland, 6354 N. 33rd Ave., Omaha, Nebr.

Filed June 27, 1958, Ser. No. 745,196

1 Claim. (Cl. 287—58)

My invention relates to new and useful improvements in an attaching head for a supporting cross bar and has for one of its objects the provision of an improved construction of this character which will be highly efficient in use and economical in manufacture.

Another and equally important object of my invention is the provision of a device of this character for readily positioning and detachably latching the attaching head to a supporting element provided by the side walls of a freight car or other freight hauling vehicles.

Another and equally important object of this invention is the provision of a longitudinally carried spring-urged latching pin carried by the latching head and adapted for projection into an aperture of a supporting or attaching element secured to or carried by a side wall of a freight car or other freight hauling vehicle, the spring which operates the pin into latched position serving to prevent its accidental displacement.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a fragmentary side elevational view of my improved attaching head for a supporting cross bar;

Fig. 2 is a top plan view of the same;

Fig. 3 is a sectional view taken substantially on line 3—3 of Fig. 1;

Fig. 4 is an end view taken substantially on line 4—4 of Fig. 1;

Fig. 5 is a fragmentary sectional view of the attaching head showing the same in latched position with respect to a supporting element.

My improved attaching head is especially adapted for use in connection with a load supporting and bracing cross bar element incorporated in a freight car or other freight hauling vehicle construction.

My improved attaching head constitutes an improvement over that shown and described in my United States Patent No. 2,817,549 dated December 24, 1957.

The several objects of my invention are accomplished by the preferred form of construction presently to be described.

A conventional load supporting and bracing crossbar element is indicated generally at 10. It includes two bar sections 11 and 12 of suitable wood and connected together at intervals in the direction of their length by means of bolts 13 which pass through a horizontal web 14 of a shell 15 comprising oppositely disposed flange portions 16 having inturned end portions 17 generally seated in longitudinal recesses 18 formed in the bars 11 and 12. In the bar 12 in its upper portion at each of its opposite ends is formed a cut-out portion or recess 19, within which is positioned a housing 20. Carried by the housing 20 is a head-bearing stud 21 which projects upwardly through a slot 22 formed in a slide bar 23 with the end portion thereof welded or otherwise connected as at 22' to the web portion 14. The slide bar 23 is of a size to have free telescopical movement within the housing 20. The slide bar 23 has integrally formed therewith an attaching head 24 comprising at its outer end portion integrally formed upwardly extending lugs 25. Formed in the outer end portion 26 of the bar 23 and between the lugs 25 is an opening 27. The latch pin 28 has an end portion 29 slidably positioned through the opening 27. A plate 30 is secured to and carried by the lugs 25 at their upper end portions. This plate 30 has an opening 31 which registers with the opening 27. Through the opening 31 the pin 28 is free to move. Formed as a part of the pin 28 is a stop shoulder 32 adapted to rest upon the bar 23 between the lugs 25. Embracing the pin 28 and disposed between the stop shoulder 32 and the plate 30 is a coil spring 33. Secured to opposite walls 34 of the freight car or other hauling vehicle are horizontal side bars 35. These side bars 35 in the form shown in the drawings are angular in cross section to provide a horizontal flange 36. The slide bar 23 below the attaching head is provided with an inwardly extending open slot 37 into which an end portion 38 of the flange 36 projects.

The flange 36 at spaced intervals is provided with openings 39 which are adapted to have registration with the opening 27. When the opening 27 is in registration with the opening 39, the pin 28 under power of the spring 33 will be projected into the opening 39 thereby to latch the cross bar 10 in a selected position with respect to the horizontal side bar 35.

To facilitate moving the pin vertically to unlatch the attaching head from the side bar 35, a relatively flat head 40 may be formed on the pin 28. To unlatch the attaching head from the side bar 35, all that is necessary is to raise the pin 28 against the action of the spring 33.

Upon unlatching of the attaching head from the horizontal side bar 35, the slide bar 23 may be moved inwardly longitudinally of the cross bar 10 within the housing 20 provided therefor. This permits the cross bar to then be entirely removed from the horizontal side bar 35.

By providing telescopical movement between the slide bar 23 and the cross bar 10, the variation in distance between the horizontal side bars 35 may be compensated. This assures locating the pin 28 always in position for projection through the opening 39 for latching purposes.

From the foregoing description, it will be apparent that I provide an attaching head for a load supporting cross bar which can be as readily mounted in latched position with a horizontally extending side bar as well as readily removed from connection with such side bar. The construction is simple, easy to operate, and can be manufactured at a very economical cost.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

An attaching head for a load supporting cross bar of a freight hauling vehicle comprising a slide bar having an integral attaching head detachably connecting the cross bar to a supporting member, said head comprising a substantially flat bottom portion having a parallelly extending spaced apart short lower lip providing a horizontally extending recess into which is adapted to be projected a portion of the cross bar supporting member, said flat bottom portion providing on its opposite face spaced apart upstanding side members, a plate mounted upon and bridging the free ends of said side members, said plate and said bottom portion of said head having aligned openings formed therein, a cylindrical pin carried by said head in spaced parallel relation to said side members and freely slidably through said openings, a stop member on said pin and extending transversely to said side members between said plate and in facial abutment with respect to said flat bottom portion of said head, a spring embracing said pin between said plate and said stop member and acting thereon for yieldably maintaining said stop member in facial abutment with said flat bottom portion of said head and for projecting said pin in one direction through said openings so that a portion thereof extends beyond said flat bottom portion, said pin when moved in said one direction cooperating with said lower lip and and said recess when the supporting member is disposed therein to detachably connect said cross bar to the supporting member.

References Cited in the file of this patent

UNITED STATES PATENTS

| | | |
|---|---|---|
| 649,444 | Good | May 15, 1900 |
| 954,671 | Danker | Apr. 12, 1910 |
| 988,807 | Paetz | Apr. 4, 1911 |
| 1,955,969 | Marzolf | Apr. 24, 1934 |
| 2,817,549 | Fahland | Dec. 24, 1957 |